(12) United States Patent
Murase

(10) Patent No.: US 10,209,857 B2
(45) Date of Patent: Feb. 19, 2019

(54) DISPLAY CONTROL APPARATUS AND DISPLAY SYSTEM

(71) Applicant: DENSO CORPORATION, Kariya, Aichi-pref. (JP)

(72) Inventor: Fumihiko Murase, Kariya (JP)

(73) Assignee: DENSO CORPORATION, Kariya, Aichi-pref., (JP)

( * ) Notice: Subject to any disclaimer, the term of this patent is extended or adjusted under 35 U.S.C. 154(b) by 0 days.

(21) Appl. No.: 15/517,468

(22) PCT Filed: Oct. 6, 2015

(86) PCT No.: PCT/JP2015/005078
§ 371 (c)(1),
(2) Date: Apr. 6, 2017

(87) PCT Pub. No.: WO2016/056227
PCT Pub. Date: Apr. 14, 2016

(65) Prior Publication Data
US 2017/0308262 A1    Oct. 26, 2017

(30) Foreign Application Priority Data
Oct. 10, 2014 (JP) .................... 2014-208939

(51) Int. Cl.
*G06F 3/0481* (2013.01)
*B60K 35/00* (2006.01)
(Continued)

(52) U.S. Cl.
CPC .......... *G06F 3/04812* (2013.01); *B60K 35/00* (2013.01); *G06F 3/041* (2013.01);
(Continued)

(58) Field of Classification Search
CPC .. G06F 3/04812; G06F 3/04842; G06F 3/041; G06F 3/04886; G06F 3/011;
(Continued)

(56) References Cited

U.S. PATENT DOCUMENTS 9,493,072 B2 * 11/2016 Goto .................. B60K 35/00
2008/0091338 A1    4/2008 Uehira
(Continued)

FOREIGN PATENT DOCUMENTS

| JP | 2005-075190 A | 9/2003 |
| JP | 2005-313772 A | 11/2005 |

(Continued)

*Primary Examiner* — Yon Couso
(74) *Attorney, Agent, or Firm* — Knobbe, Martens, Olson & Bear, LLP

(57) ABSTRACT

A display control apparatus performs overlapping display of a highlight image against a notification object that is visually recognized through a picture projection plane of a virtual image display apparatus used by a driver of a vehicle such that the highlight image represents the notification object. A target information acquisition section acquires target information including at least a position and a size of the notification object. A display execution section displays a first highlight image and a second highlight image in a display form capable of identifying each of the first highlight image and the second highlight image based on target information acquired by the target information acquisition section. The first highlight image corresponds to a size of the notification object, while the second highlight image results from enlarging the first highlight image at a predetermined magnification percentage.

19 Claims, 6 Drawing Sheets

(51) Int. Cl.
  *G06F 3/041* (2006.01)
  *G06F 3/0488* (2013.01)
  *G06F 3/048* (2013.01)
  *G08G 1/16* (2006.01)
  *G06F 3/0484* (2013.01)
  *G06F 3/01* (2006.01)

(52) U.S. Cl.
  CPC .......... *G06F 3/048* (2013.01); *G06F 3/04886* (2013.01); *G08G 1/165* (2013.01); *G08G 1/166* (2013.01); *B60K 2350/1072* (2013.01); *B60K 2350/2052* (2013.01); *G06F 3/011* (2013.01); *G06F 3/04842* (2013.01)

(58) Field of Classification Search
  CPC .................. G06F 3/048; G01C 21/365; G02B 2027/0141; G02B 2027/014; G08G 1/096; G08G 1/165; G08G 1/166; B60R 2300/308; B60R 2300/8093; G06K 9/00805; B60K 35/00; B60K 2350/1072; B60K 2350/2052
  See application file for complete search history.

(56) References Cited

U.S. PATENT DOCUMENTS

| | | | |
|---|---|---|---|
| 2014/0139672 A1* | 5/2014 | Murashita | G08G 1/166 348/148 |
| 2016/0110618 A1* | 4/2016 | Oba | G06K 9/00805 348/148 |
| 2016/0209647 A1* | 7/2016 | Fursich | G02B 27/0093 |
| 2018/0024354 A1* | 1/2018 | Shibata | B60K 35/00 345/7 |

FOREIGN PATENT DOCUMENTS

| | | |
|---|---|---|
| JP | 2005-343351 A | 12/2005 |
| JP | 2009-152951 A | 7/2009 |
| JP | 2010-120617 A | 6/2010 |
| JP | 2012-148710 A | 8/2012 |
| JP | 2012-218505 A | 11/2012 |
| JP | 2013-196359 A | 9/2013 |
| JP | 2014-10800 A | 1/2014 |

* cited by examiner

FIG. 6
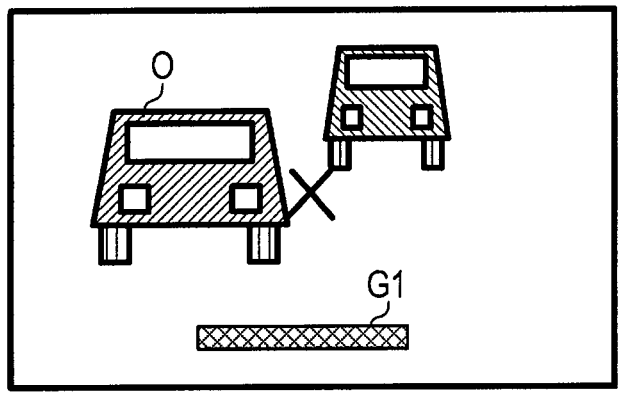
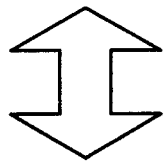
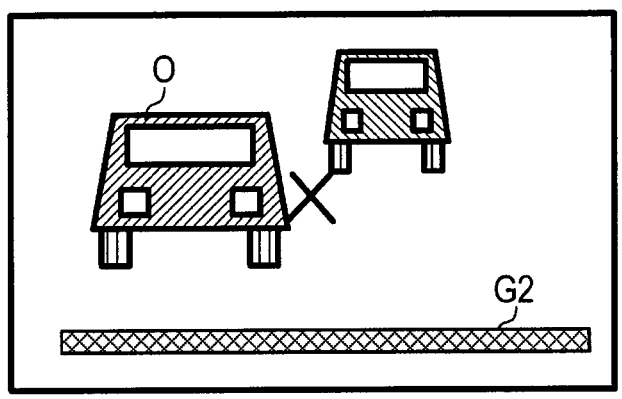

FIG. 7A
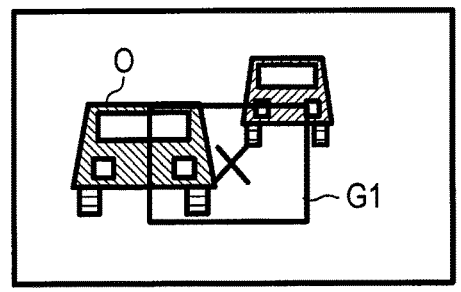
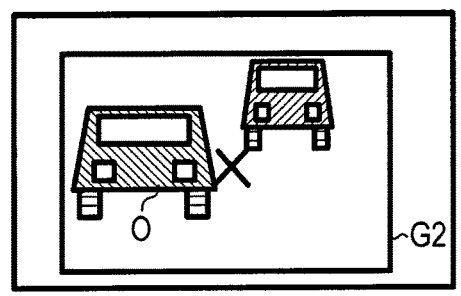
FIG. 7B
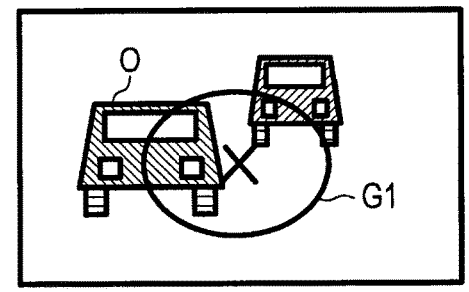
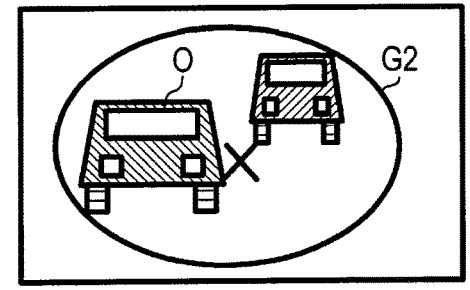

FIG. 7C
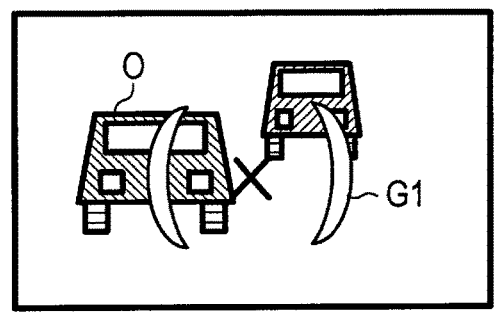
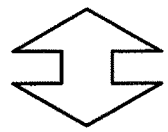
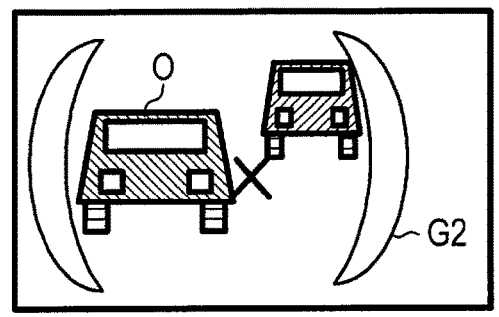

DISPLAY CONTROL APPARATUS AND DISPLAY SYSTEM

CROSS REFERENCE TO RELATED APPLICATION

The present application is based on Japanese Patent Application No. 2014-208939 filed on Oct. 10, 2014, the disclosure of which is incorporated herein by reference.

TECHNICAL FIELD

The present disclosure relates to a display control apparatus that controls display implemented by a virtual image display apparatus.

BACKGROUND ART

There is conventionally known a technology that performs overlapping display of a highlight image to a notification object ahead of a vehicle using a virtual image display apparatus such as a head-up display so that the highlight image represents the presence of the notification object.

There is known a frame-shaped highlight image surrounding a notification object or a linear highlight image displayed below a notification object.

A positional difference occurs between a notification object and a highlight display based on the detection accuracy of a radar to detect the notification object or an error resulting from installing or manufacturing a head-up display or a windshield. The positional difference may not only annoy a user, but also allow the user to incorrectly recognize the notification object in some cases.

To solve this, there is proposed a technology that predetermines a sufficiently large area represented by a highlight image so that a notification object reliably fits into an area indicated by a frame-shaped highlight image (see patent literature 1).

PRIOR ART LITERATURES

Patent Literature

Patent literature 1: JP 2010-120617 A

SUMMARY OF INVENTION

However, the prior-art technology may allow an area represented by the highlight image to contain several objects that can be assumed to be notification objects. In this case, it may not be easy to discriminate which of the notification objects is authentic.

It is an object of the present disclosure to provide a display control apparatus that allows a virtual image display apparatus to easily discriminate a notification object.

According to an example of the present disclosure, a display apparatus is provided to include a target information acquisition section and a display execution section. The target information acquisition section acquires target information including at least a position and a size of a notification object. The display execution section displays a first highlight image and a second highlight image in a display form capable of identifying each of the first highlight image and the second highlight image based on target information acquired by the target information acquisition section. The first highlight image corresponding to a size of the notification object, while the second highlight image results from enlarging the first highlight image at a predetermined magnification percentage.

According to this configuration, the second highlight image can specify an area where a notification object exists. Information acquired from the first highlight image can easily determine which target is the notification object even if several targets exist in the area.

BRIEF DESCRIPTION OF DRAWINGS

The above and other objects, features and advantages of the present disclosure will become more apparent from the following detailed description made with reference to the accompanying drawings. In the drawings:

FIG. 6 is a diagram illustrating an example of displaying a highlight image using a display shape in the form of a rod in moving image mode;

FIG. 7A is a diagram illustrating an example of displaying a highlight image using a display shape in the form of a rectangle in moving image mode;

FIG. 7B is a diagram illustrating an example of displaying a highlight image using a display shape in the form of an oval in moving image mode; and FIG. 7C is a diagram illustrating an example of displaying a highlight image using a display shape in the form of parentheses in moving image mode.

EMBODIMENTS FOR CARRYING OUT INVENTION

Embodiments of the present disclosure will be described with reference to the accompanying drawings.

[Configuration]

Figure 1:
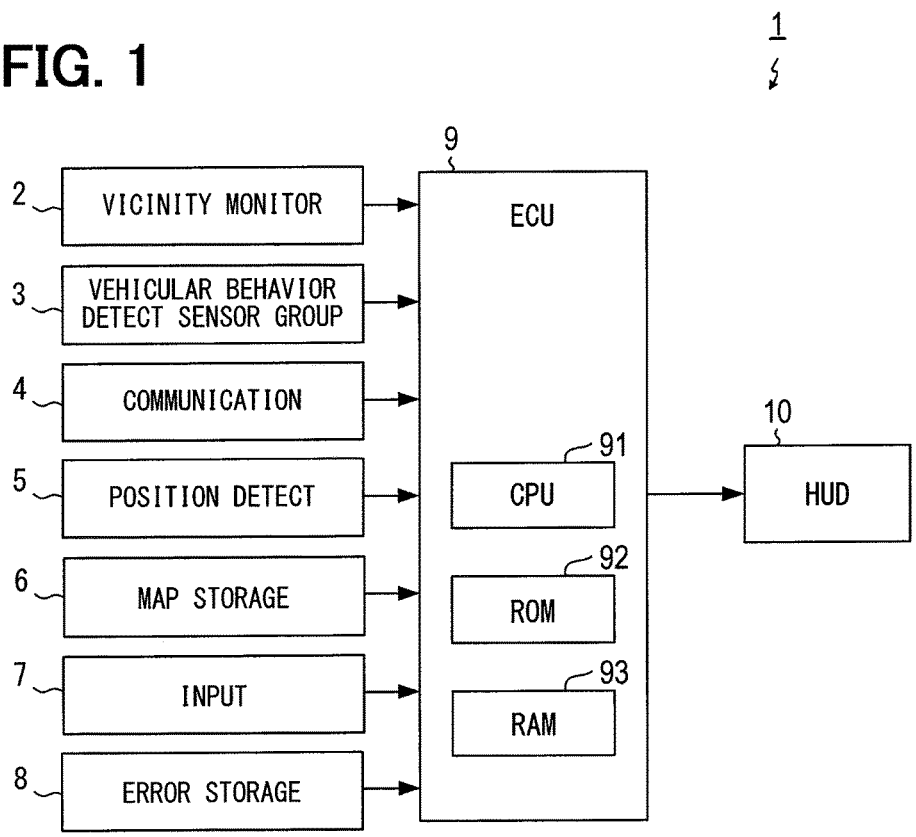
FIG. 1 is a block diagram illustrating a configuration of a vehicular display system.

A vehicular display system 1 in FIG. 1 includes a vicinity monitoring apparatus 2, a vehicle behavior detection sensor group 3, a communication apparatus 4, a position detection apparatus 5, a map storage apparatus 6, an input apparatus 7, an error storage apparatus 8, an electronic control unit (ECU) 9, and a head-up display (HUD) 10. These components are configured to transmit and receive information via an in-vehicle LAN (unshown). A vehicle mounted with the vehicular display system 1 is also referred to as a host vehicle in the description below. The term "information" is used as a countable noun as well as an uncountable noun.

The vicinity monitoring apparatus 2 monitors the presence or absence of an obstacle in the vicinity of the vehicle using a radar sensor or an image sensor and generates information containing at least a position and a size of a detected obstacle. The vicinity of the vehicle signifies a range of a predetermined angle ahead of the vehicle. The obstacle in this context signifies an object in general such as another vehicle, a pedestrian, a building, or a fallen object.

The radar sensor uses infrared, millimeter waves, or ultrasonic waves as a radar wave and detects a distance to a target (i.e., radar target) reflecting the radar wave or a direction in which the target exists. The image sensor is configured as a CCD camera or an infrared camera according to a known technology. The image sensor detects a target by applying various image processes to an acquired image and extracts information (such as an external shape or a target type) about the target.

The vehicle behavior detection sensor group 3 includes various sensors such as a vehicle speed sensor, an acceleration sensor, a yaw rate sensor, and a steering angle sensor that output signals to represent vehicle behavior.

The communication apparatus 4 acquires a variety of information affecting driving actions by performing road-to-vehicle communication and inter-vehicle communication.

The position detection apparatus 5 includes a GPS receiver, a gyroscope, and a distance sensor. The GPS receiver receives a signal transmitted from a satellite for GPS (Global Positioning System) and detects a position coordinate or an altitude of the vehicle. The gyroscope outputs a detection signal corresponding to an angular velocity of rotational motion applied to the vehicle. The distance sensor outputs a mileage of the vehicle. The position detection apparatus 5 finds a current position of the vehicle based on signals output from the sensors.

The map storage apparatus 6 stores map data associated with the position coordinate. As is well known, the map data contains a road type, a road gradient, and regulation information in addition to a road shape that are used for navigation systems.

The input apparatus 7 includes various input instruments such as a switch and a touch panel and is used to start or stop various functions such as a navigation function and an ACC function provided for the vehicle and configure settings concerning the functions.

The error storage apparatus 8 stores magnitudes of various errors affecting the display of the HUD 10. Specifically, the error storage apparatus 8 stores detection error E1 in the vicinity monitoring apparatus 2, error E2 in assembling or manufacturing components of the HUD 10, and error E3 in assembling or manufacturing the windshield. As in equation (1), error Ei (i=1 through 3) each represents the maximum value for an error between the position displayed on the HUD 10 based on a detection result and the actual position of a detection object with respect to upward, downward, rightward, and leftward directions. Eui[%] represents an upward error. Edi[%] represents a downward error. Eri[%] represents a rightward error. Eli[%] represents a leftward error.

[Math. 1]

$$Ei+(Eui,Edi,Eri,Eli) \quad (1)$$

The HUD 10 provides a display apparatus (a display apparatus dedicated to a driver) visually recognized by the driver while driving. The HUD 10 displays an image overlapped with a scene outside the vehicle (a visual field ahead of the driver) visually recognized through a position in front of the driver on the windshield (front window) used as a picture projection plane. The image displayed by the HUD 10 is visually recognized as a virtual image on an imaging plane for images further ahead of the windshield. The HUD 10 can also function as a virtual image display apparatus.

A transparent screen (so-called combiner) may be placed away from the windshield inside the vehicle to display an image overlapped with a scene outside the vehicle visually recognized through the combiner and the windshield.

The ECU 9 according to the embodiment includes a microcomputer equipped with a CPU 91, ROM 92, and RAM 93. The CPU 91 performs a process corresponding to a program recorded in a recording medium such as the ROM 92 to overall control the vehicular display system 1. The ECU 9 performs at least an obstacle detection process, a notification object setup process, a display form setup process, and a notification process. The obstacle detection process detects various obstacles based on information from the vicinity monitoring apparatus 2. The notification object setup process sets an obstacle to be notified (notification object) according to a predetermined condition based on a detection result from the obstacle detection process, information acquired from the vehicle behavior detection sensor group 3, the communication apparatus 4, and the position detection apparatus 5, and an order supplied from the input apparatus 7. The obstacle detection process and a notification information generation process are associated with a known technology and a detailed description is omitted. The ECU 9 functions as a display control apparatus.

The notification process highlights a notification object to allow a driver to recognize the notification object set by the notification object setup process. The detail will be described later. The display form setup process sets a display form in accordance with input from the input apparatus 7 so that the notification process uses the display form to highlight a notification object. The setup content includes a display mode and a display shape. The display mode includes a normal mode to display a still image and a moving image mode to display a moving image (animation). The display shape includes a rod (with or without overlapping), an external shape of an object, a rectangle, an oval, and parentheses.

The embodiment describes implementation of the functions assigned to the ECU 9 using software as a mere example. All or part of the functions may be implemented on hardware such as a logic circuit.

[Process]

Figure 2:
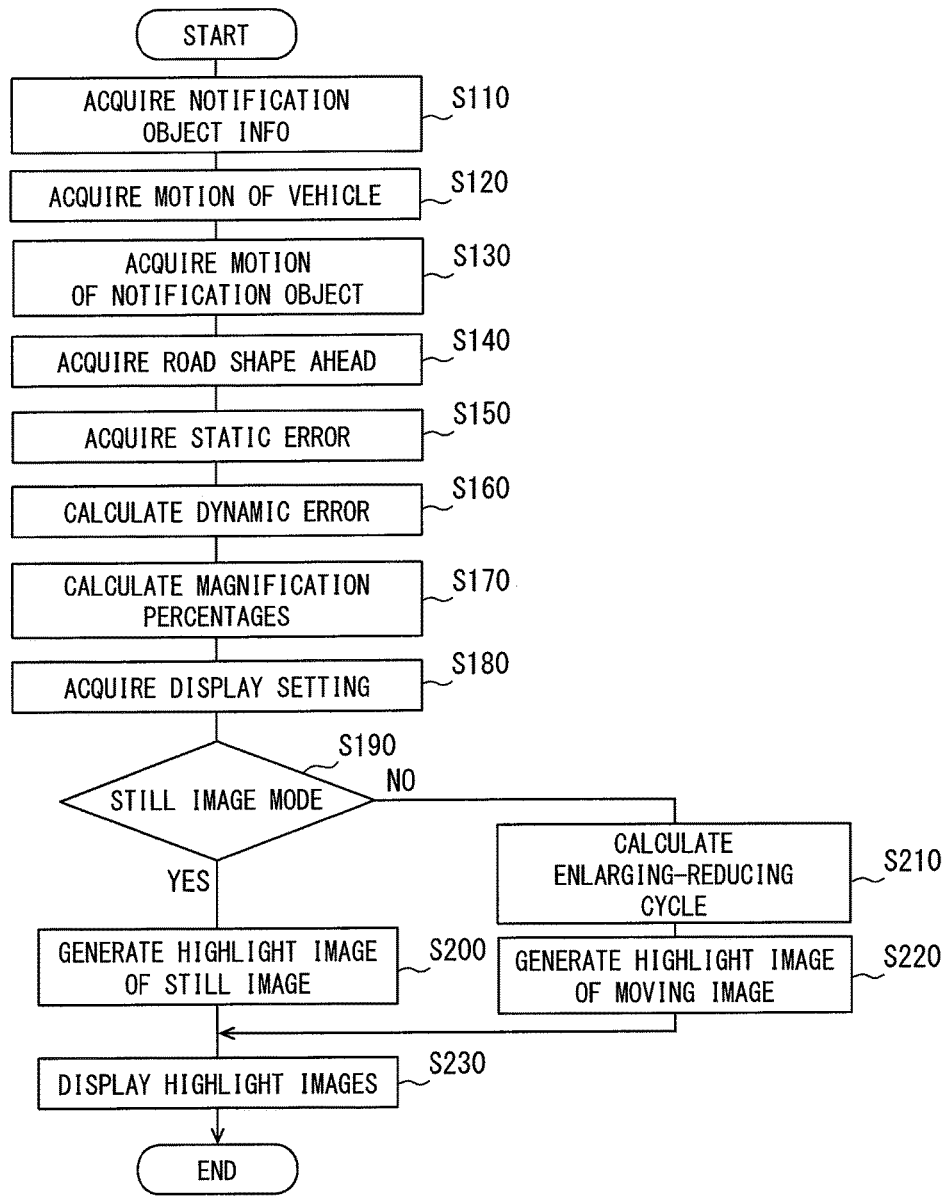
FIG. 2 is a flowchart illustrating a notification process.

The description below explains the notification process performed by the CPU 91 with reference to a flowchart in FIG. 2. The process starts each time the notification object setup process sets a notification object. The example below describes a preceding vehicle that is tracked during automatic tracking travel and is set as a notification object.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

At S110 after the process starts, the CPU 91 acquires a variety of information about the notification object from the vicinity monitoring apparatus 2. Specifically, the CPU 91 acquires position information representing a position of the notification object, namely, a relative position in relation to a vehicle (host vehicle), size information representing a width and a height of the notification object, shape information representing an external shape of the notification object, and color information representing a color whose share is highest in the notification object.

At S120, the process acquires motion information about the vehicle based on the information from the vehicle behavior detection sensor group 3 or the position detection apparatus 5. The motion information includes a vehicle speed, an acceleration, a yaw rate, and a steering amount.

At S130, the process acquires the motion information about the notification object. The motion information to be acquired represents the motion of the notification object with reference to a road surface based on: the information that is acquired from the vicinity monitoring apparatus 2 and represents the relative motion of the notification object in relation to the vehicle; and the motion information about the vehicle acquired at S120.

At S140, the process acquires a road shape ahead of the vehicle. Specifically, the process acquires the road shape by searching the map storage apparatus 6 based on the information such as the current position or the travel direction of the vehicle acquired from the position detection apparatus 5. Further, the road shape may be estimated from positions of various targets detected by the vicinity monitoring apparatus 2.

At S150, the process acquires error information (static error) E1 through E3 stored in the error storage apparatus 8. At S160, the process calculates dynamic errors Ku, Kd, Kr, and Kl based on the detection delay time in the vicinity monitoring apparatus 2, the vehicle speed, the relative speed in relation to a preceding vehicle, and the road shape (such as the curvature of a curve or the road gradient). Dynamic errors Ku, Kd, Kr, and Kl are found to represent positional differences in the upward, downward, rightward, and leftward directions between the detected position of the notification object and the position of the notification object when displayed on the HUD 10. The positional difference results from a detection delay in the vicinity monitoring apparatus 2. Dynamic errors Ku, Kd, Kr, and Kl are each set to 1 if no error needs to be considered.

At an entry to a right curve, for example, the preceding vehicle is highly likely to be positioned rightward from the detected position due to a detection delay in the vicinity monitoring apparatus 2. Dynamic error Kr in the rightward direction is set to be larger than 1. Dynamic error Kl in the leftward direction is set to be smaller than 1. At an entry to an ascending slope, the preceding vehicle is highly likely to be positioned upward from the detected position. Dynamic error Ku in the upward direction is set to be larger than 1. Dynamic error Kd in the downward direction is set to be smaller than 1. Dynamic errors Ku, Kd, Kr, and Kl vary with the curvature of a curve, the gradient, or the relative speed of the preceding vehicle in relation to the vehicle and therefore may be variable depending on these values.

At S170, the process calculates magnification percentages Mu, Md, Mr, and Ml for a highlight image in the upward, downward, rightward, and leftward directions based on error information E1 through E3 acquired at S150 and dynamic errors Ku, Kd, Kr, and Kl calculated at S160 by using equations (2) through (5). The magnification percentage is set to a value capable of covering a range of irregular display.

[Math. 2]

$$Mu = Ku\prod_i(1 + Eui/100) \qquad (2)$$

$$Md = Kd\prod_i(1 + Edi/100) \qquad (3)$$

$$Mr = Kr\prod_i(1 + Eri/100) \qquad (4)$$

$$Ml = Kl\prod_i(1 + Eli/100) \qquad (5)$$

At S180, the process acquires a display setting set by the display form setup process that is performed separately. At S190, the process determines whether a display mode indicated in the display setting equals the still image mode. The process proceeds to S200 if the display mode equals the still image mode (S190: YES). The process generates a highlight image of the still image according to a display shape indicated in the display setting and proceeds to S230.

The process proceeds to S210 if the display mode is not the still image mode but the moving image mode (S190: NO). The process calculates an enlarging-reducing cycle to repeat enlarged display and reduced display of the highlight image. The enlarging-reducing cycle varies with a degree of hazard estimated from surrounding situations.

At S220, the process generates a highlight image for a moving image based on the display shape indicated in the display setting and the enlarging-reducing cycle set at S210, and then proceeds to S230. At S230, the process displays the highlight image generated at S200 or S230 on the HUD 10 and terminates.

The CPU 91 can function as a target information acquisition section at S110, as a display execution section at S180 through S230, as a magnification percentage setup section at S170, and as an enlarging-reducing cycle setup section at S210.

[Operation]

Figure 3:
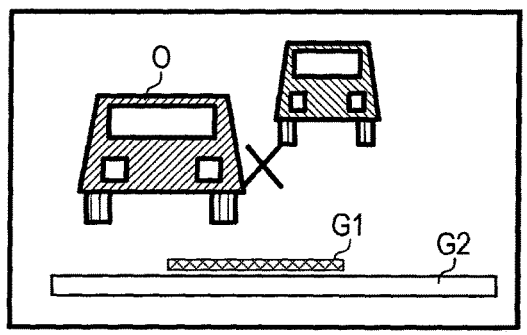
FIG. 3 is a diagram illustrating an example of displaying a highlight image using a display shape in the form of a rod in still image mode.

The still image mode simultaneously displays a first highlight image and a second highlight image each as a highlight image (also referred to as a highlight order). The first highlight image corresponds to a detection size of a notification object. The second highlight image results from enlarging the detection size at the magnification percentage set at S170. FIG. 3 illustrates the display shape in the form of a rod. Second highlight image G2 represents an available range where notification object (a preceding vehicle to be tracked) O exists; the available range is set in consideration of various errors. First highlight image G1 represents the size of notification object O. Only magnification percentages Mr and Ml in the rightward and leftward directions are applied to the display shape in the form of a rod. Mark x in the diagram denotes a position to detect notification object O. The diagram illustrates only a predetermined rectangular range around the detection position, not the entire screen. The same applies to FIGS. 4 through 7 to be described later.

Figure 4:
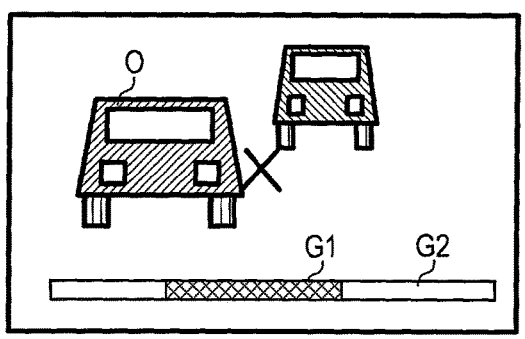
FIG. 4 is a diagram illustrating another example of displaying a highlight image using a display shape in the form of a rod in still image mode.
Figure 5:
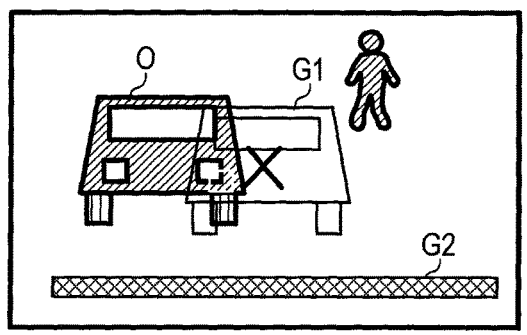
FIG. 5 is a diagram illustrating an example of displaying a first highlight image using a display shape in the form of an external shape of a notification object and a second highlight image using a display shape in the form of a rod in still image mode.

FIG. 3 illustrates an example of separately displaying first highlight image G1 and second highlight image G2. FIG. 4 illustrates an example of overlapping both with each other. In FIG. 5, second highlight image G2 uses the display shape in the form of a rod. First highlight image G1 uses the display shape in the form of an external shape of notification object O.

The moving image (animation) mode displays first highlight image G1 and second highlight image G2 alternately at the enlarging-reducing cycle set at S210 or by continuously changing the sizes. As in FIG. 6, first highlight image G1 is displayed at one time point and second highlight image G2 is displayed at another time point.

As in FIG. 6, the display shape in the form of a rod, but is not limited thereto. The display shape may be used in the form of a rectangle (see FIG. 7A), an oval (see FIG. 7B), or parentheses (see FIG. 7C).

[Effects]

As above, the vehicular display system 1 can use the second highlight image to specify an area where a notification object exists. The vehicular display system 1 can use information acquired from the first highlight image to easily determine which target corresponds to a notification object even when several targets exist in the area.

The vehicular display system 1 sets the magnification percentage of the second highlight image based on a static error and uses a dynamic error to vary the magnification percentage in the upward, downward, rightward, and leftward directions depending on situations rather than equally. The vehicular display system 1 can therefore accurately indicate a range where a notification object is likely to exist.

The vehicular display system 1 varies the enlarging-reducing cycle depending on situations. The display can allow a driver to recognize information such as a degree of hazard.

OTHER EMBODIMENTS

While there has bee described the embodiment of the present disclosure, the present disclosure is not limited to the above-mentioned embodiment but may be embodied variously.

(1) The above-mentioned embodiment determines a notification object by fitting the first highlight image to the detection size of the notification object. In addition, the first highlight image may be displayed in a color corresponding to the color information (a color whose share is high in the notification object). In this case, the notification object can be determined more easily.

(2) The above-mentioned embodiment sets the magnification percentage by using both the static error and the dynamic error. However, only the static error may be used.

(3) The above-mentioned embodiment describes the virtual image display apparatus by using the HUD 10 mounted on the vehicle, but is not limited thereto. The HUD 10 may be replaced by a head mounted display worn by a driver.

(4) The present disclosure can be variously embodied as not only a display control apparatus and a display system, but also a system including the display control apparatus and the display system as constituent elements, a program product stored in a non-transitory computer-readable storage medium including an instruction to allow a computer to function as the display control apparatus, a non-transitory computer-readable storage medium that stores this program product, and a display control method.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A display control apparatus for controlling a virtual image display apparatus of a vehicle to display highlight images on a picture projection plane of the vehicle, the highlight images representing an existence of a notification object that is visually recognizable through the picture projection plane by a driver of the vehicle, the display control apparatus comprising:
an electronic control unit configured to:
acquire target information including at least a position and a size of the notification object;
display a first highlight image on the picture projection plane of the vehicle using the virtual image display apparatus; and
display a second highlight image on the picture projection plane of the vehicle using the virtual image display apparatus, the second highlight image corresponding to the first highlight image enlarged at a predetermined magnification percentage,
wherein the first highlight image represents the size of the notification object, and
wherein the second highlight image represents an area where the notification object exists.

2. The display control apparatus according to claim 1, wherein
the predetermined magnification percentage is set to a value so that the notification object is included in the area indicated by the second highlight image according to a display error based on at least one error among a manufacturing error, an assembly error, and a detection error.

3. The display control apparatus according to claim 1, wherein
the electronic control unit is further configured to variably set the predetermined magnification percentage according to at least either motion information of the vehicle or a road shape of the vehicle.

4. The display control apparatus according to claim 1, wherein
the electronic control unit simultaneously displays the first highlight image and the second highlight image.

5. The display control apparatus according to claim 1, wherein
the electronic control unit switches between the first highlight image and the second highlight image to repeat reduced display and enlarged display, as time advances.

6. The display control apparatus according to claim 5, wherein
the electronic control unit is further configured to variably set a cycle of the reduced display and the enlarged display based on motion of the notification object.

7. The display control apparatus according to claim 1, wherein
the electronic control unit displays the first highlight image using a color included in the notification object.

8. The display control apparatus according to claim 1, wherein
the electronic control unit uses a shape representing the notification object as the first highlight image.

9. A display system comprising:
a virtual image display apparatus; and
the display control apparatus, according to claim 1, executing a display control using the virtual image display apparatus.

10. The display control apparatus according to claim 1, wherein
the predetermined magnification percentage is set to a value to cause the second highlight image to represent the area where the notification object exists, according to a display error based on at least one error among a manufacturing error, an assembly error, and a detection error.

11. A display system comprising:
a virtual image display apparatus in a vehicle to display highlight images on a picture projection plane of the vehicle, the highlight images representing an existence of a notification object that is visually recognizable through the picture projection plane by a driver of the vehicle, the images being overlapped with a scene outside of the vehicle through the picture projection plane of the vehicle; and
a display control apparatus executing a display control of the virtual image display apparatus, the display control apparatus comprising:
an electronic control unit configured to:
  acquire target information including at least a position and a size of the notification object;
  display a first highlight image on the picture projection plane of the vehicle using the virtual image display apparatus; and
  display a second highlight image on the picture projection plane of the vehicle using the virtual image display apparatus, the second highlight image corresponding to the first highlight image enlarged at a predetermined magnification percentage,
wherein the first highlight image represents the size of the notification object included in the target information, and
wherein the second highlight image represents an area where the notification object exists.

12. The display system according to claim 11, wherein the predetermined magnification percentage is set to a value so that the notification object is included in the area indicated by the second highlight image according to a display error based on at least one error among a manufacturing error, an assembly error, and a detection error.

13. The display system according to claim 11, wherein the electronic control unit is further configured to variably set the predetermined magnification percentage according to at least either motion information of the vehicle or a road shape of the vehicle.

14. The display system according to claim 11, wherein the electronic control unit simultaneously displays the first highlight image and the second highlight image.

15. The display system according to claim 11, wherein the electronic control unit switches between the first highlight image and the second highlight image to repeat reduced display and enlarged display, as time advances.

16. The display system according to claim 15, wherein the electronic control unit is further configured to variably set a cycle of the reduced display and the enlarged display based on motion of the notification object.

17. The display control apparatus according to claim 11, wherein
the electronic control unit displays the first highlight image using a color included in the notification object.

18. The display system according to claim 11, wherein the electronic control unit uses a shape representing the notification object as the first highlight image.

19. The display system according to claim 11, wherein the predetermined magnification percentage is set to a value to cause the second highlight image to represent the area where the notification object exists, according to a display error based on at least one error among a manufacturing error, an assembly error, and a detection error.

* * * * *